(12) United States Patent
Santra et al.

(10) Patent No.: US 7,654,326 B1
(45) Date of Patent: Feb. 2, 2010

(54) SOREL CEMENTS AND METHODS OF MAKING AND USING SAME

(75) Inventors: Ashok Santra, Duncan, OK (US); Christopher L. Gordon, Duncan, OK (US); Daniel L. Bour, Granite Falls, WA (US); Keith D Pewitt, Duncan, OK (US); Dwain King, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 12/217,950

(22) Filed: Jul. 10, 2008

(51) Int. Cl.
*E21B 33/13* (2006.01)
*E21B 33/138* (2006.01)
*C09K 8/504* (2006.01)

(52) U.S. Cl. ............... 166/292; 106/684; 106/685; 166/277; 166/300; 175/72; 507/140; 507/142; 507/269; 507/274

(58) Field of Classification Search ............. None
See application file for complete search history.

(56) References Cited

U.S. PATENT DOCUMENTS

| 2,745,759 | A | * | 5/1956 | Pavlish | ............... | 106/685 |
| 3,320,077 | A | * | 5/1967 | Prior | ............... | 106/683 |
| 5,913,364 | A | | 6/1999 | Sweatman | | |
| 6,167,967 | B1 | * | 1/2001 | Sweatman | ............... | 166/281 |
| 6,258,757 | B1 | | 7/2001 | Sweatman et al. | | |
| 6,664,215 | B1 | * | 12/2003 | Tomlinson | ............... | 507/269 |
| 7,246,665 | B2 | * | 7/2007 | Almond et al. | ............... | 166/294 |
| 7,530,394 | B2 | * | 5/2009 | Santra et al. | ............... | 166/292 |
| 2004/0040711 | A1 | * | 3/2004 | Tomlinson | ............... | 166/292 |
| 2005/0241828 | A1 | * | 11/2005 | Almond et al. | ............... | 166/292 |
| 2008/0000640 | A1 | * | 1/2008 | Santra et al. | ............... | 166/292 |
| 2008/0105428 | A1 | * | 5/2008 | Santra et al. | ............... | 166/293 |
| 2008/0169100 | A1 | * | 7/2008 | Lewis et al. | ............... | 166/293 |

OTHER PUBLICATIONS

Hewlett, Peter, "Lea's Chemistry of Cement and Concrete," Fourth Edition, 1998, pp. 813-820, Elsevier Publishing.

* cited by examiner

*Primary Examiner*—George Suchfield
(74) *Attorney, Agent, or Firm*—Robert A. Kent; Conley Rose, P.C.

(57) ABSTRACT

A method of servicing a wellbore comprising contacting a metal oxide, a soluble chloride or phosphate salt, water, and a liquid retarder to form a cement composition via a continuous process, wherein the liquid retarder is an aqueous solution having a concentration of less than about 25 w/v %, placing the cement composition into the wellbore, and allowing the cement composition to set. A method of servicing a wellbore comprising (a) contacting an aqueous solution with a soluble salt to form a salt solution, (b) contacting an aqueous solution with a solid retarder to form a liquid retarder wherein the liquid retarder has concentration of less than about 25 w/v %, (c) contacting water, the salt solution, and the liquid retarder to form a mixture, (d) contacting the mixture with a metal oxide to form a cement slurry, wherein the cement slurry is produced with an output rate of from about 0.5 barrels per minute to about 20 barrels per minute, (e) placing the cement slurry into the wellbore, and (f) allowing the cement slurry to set.

20 Claims, 5 Drawing Sheets

SOREL CEMENTS AND METHODS OF MAKING AND USING SAME

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

1. Technical Field

The present disclosure generally relates to wellbore servicing fluids. More particularly, this disclosure relates to cement compositions and methods of making and using same.

2. Background

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. The main objectives of primary cementing operations include zonal isolation to prevent migration of fluids in the annulus, support for the casing or liner string, and protection of the casing string from corrosive formation fluids. Subsequent secondary cementing operations may also be performed to repair primary cementing problems or to treat conditions arising after the wellbore has been constructed.

Fluids used in servicing a wellbore may sometimes be lost to the subterranean formation while circulating the fluids in the wellbore. In particular, the fluids may enter the subterranean formation via depleted zones, zones of relatively low pressure, lost circulation zones having naturally occurring fractures, weak zones having fracture gradients exceeded by the hydrostatic pressure of the drilling fluid, and so forth. As a result, the service provided by such fluids is more difficult to achieve. For example, a drilling fluid may be lost to the formation, resulting in the circulation of the fluid in the wellbore being too low to allow for further drilling of the wellbore. Also, a secondary cement/sealant composition may be lost to the formation as it is being placed in the wellbore, thereby rendering the secondary operation ineffective in maintaining isolation of the formation.

Lost circulation treatments involving various plugging materials such as walnut hulls, mica, and cellophane have been used to prevent or lessen the loss of fluids from wellbores. The disadvantages of such treatments include the potential for damage to subterranean formations as a result of the inability to remove the plugging materials therefrom and the dislodgement of the plugging materials from highly permeable zones whereby fluid losses subsequently resume. One technique for preventing lost circulation problems has been to temporarily plug voids or permeable zones with Sorel cement compositions. Sorel cement compositions typically comprise magnesium oxide and a chloride or phosphate salt and water which together form for example magnesium oxychloride. Sorel cements can be removed with minimal damage to subterranean zones or formations by dissolution in acids. One challenge to the use of Sorel cements is that in order to control the rheology of the cement and achieve process-desired properties such as predictable thickening times and right angle set, the components of the cement are contacted in an obligatory sequence. This obligatory sequence introduces undesirable process limitations and impacts the cost and efficiency of wellbore servicing operations utilizing these types of cements. Accordingly, it would be desirable to develop Sorel cement compositions that can retain process-desired properties while having a flexible preparation sequence.

SUMMARY

Disclosed herein is a method of servicing a wellbore comprising contacting a metal oxide, a soluble chloride or phosphate salt, water, and a liquid retarder to form a cement composition via a continuous process, wherein the liquid retarder is an aqueous solution having a concentration of less than about 25 w/v %, placing the cement composition into the wellbore, and allowing the cement composition to set.

Also disclosed herein is a method of servicing a wellbore comprising (a) contacting an aqueous solution with a soluble salt to form a salt solution, (b) contacting an aqueous solution with a solid retarder to form a liquid retarder wherein the liquid retarder has concentration of less than about 25 w/v %, (c) contacting water, the salt solution, and the liquid retarder to form a mixture, (d) contacting the mixture with a metal oxide to form a cement slurry, wherein the cement slurry is produced with an output rate of from about 0.5 barrels per minute to about 20 barrels per minute, (e) placing the cement slurry into the wellbore, and (f) allowing the cement slurry to set.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are wellbore servicing fluids comprising a Sorel cement, a liquid retarder (LR), and sufficient water to form a pumpable slurry. Typically, a Sorel cement and a solid retarder are contacted in an obligatory sequence in order for the retarder to effectively modulate the thickening and set time of the composition. Hereinafter this obligatory contacting sequence is referred to as a conventional contacting sequence. In an embodiment, the Sorel cement and the LR of this disclosure may be contacted in any sequence and retain the effectiveness of the retarder in modulating the thickening and set time of the composition. This flexible mixing sequence may allow for the production of large volumes of such cements via a continuous process. Hereinafter, such compositions that may be prepared by a continuous process are termed continuous process cement compositions, (CPCCs).

In various embodiments, Sorel cements comprise a metal oxide such as magnesium oxide, and a soluble salt such as a chloride or phosphate salt. In an embodiment, the CPCC comprises a Sorel cement wherein the Sorel cement comprises a magnesia based cement. A discussion of various magnesia-based cements can be found in *Lea's Chemistry of Cement and Concrete* by Peter Hewlett: Fourth Edition, pages 813-820: 1998: Elsevier Publishing which is by reference herein. Specifically, Lea discloses as follows.

Magnesium oxychloride or Sorel cement is made by contacting powdered magnesium oxide (magnesia) with a concentrated solution of magnesium chloride. The principal phases formed are $Mg_3(OH)_5Cl \cdot 4H_2O$ and $Mg_2(OH)_3Cl \cdot 4H_2O$. With atmospheric $CO_2$ attack, two other phases are formed $Mg_{20}HClCO_3 \cdot H_2O$ and $Mg_5(OH)_2(CO_3)_4 \cdot 4H_2O$. Dissolution of MgO in the $MgCl_2$ solution leads to formation of a gel (setting) and occurs before the crystallization of the other hydrates takes place. Sorel cements have, for a given porosity, better mechanical strengths than ordinary Portland cements. The bonding mechanism in this cement is similar to that of gypsum cement. Sorel cements also have a noteworthy adhesion to salt (sodium chloride).

The chemical reaction of these materials is affected by the quality of the magnesia which may have been produced by consistent, adequate burning. Underburning produces an excessively reactive product and overburning an insufficiently reactive material. The hydration reactions are complex and can be represented basically as follows:

$$5MgO + MgCl_2 + 13H_2O \rightarrow 2\{Mg_3(OH)_5Cl \cdot 4H_2O\}$$

$$3MgO + MgCl_2 + 11H_2O \rightarrow \{Mg_2(OH)_3Cl \cdot 4H_2O\}$$

$$3MgO + MgCl_2 + 2CO_2 + 7H_2O \rightarrow 2\{Mg_2(OH)_3Cl \cdot 4H_2O\}$$

$$5MgO + 4CO_2 + 5H_2O \rightarrow Mg_5(OH)_2(CO_3)_4 \cdot 4H_2O$$

$$Mg_3(OH)_5Cl \cdot 4H_2O + 2CO_2 \rightarrow Mg_2OHClCO_3 \cdot 3H_2O + MgCO_3 + 3H_2O$$

$$MgO + MgCl_2 + 2MgCO_3 + 7H_2O \rightarrow 2Mg_2OHClCO_3 \cdot 3H_2O$$

$$Mg_2(OH)_3Cl \cdot 4H_2O + CO_2 \rightarrow 4Mg_2OHClCO_3 \cdot 3H_2O + 2H_2O$$

$$MgO + 4MgCO_3 + 5H_2O \rightarrow Mg_5(OH)_2(CO_3)_4 \cdot 4H_2O$$

Resistance to water depends upon the transformation of the hydroxychloride hydrates to the insoluble carbonates and can be improved by the incorporation of certain additives. These additives can be inorganic, such as phosphates, borax and calcium sulfate-silicate mixtures, or organic, such as resins, melamine urea and formaldehyde. Such additions normally cause a slowing down in compressive strength development. Sorel cements have high early strengths and can be used with many different kinds of aggregates in large quantities, such as glass fibres, wood and expanded clays.

Sorel cement, particularly with siliceous and aluminous aggregates, has been used as a refractory oilwell cement at up to 850° C. The principal binder at 300-450° C. had been identified as a hydrated magnesium aluminosilicate having the composition $3MgO \cdot Al_2O_3 \cdot 0.5SiO_2 \cdot nH_2O$.

Sorel cements are most commonly employed for industrial flooring, due to their elastic properties and resistance to accumulated static loads. Their main disadvantages are dimensional instability, poor freeze-thaw resistance, and lack of resistance to atmospheric agents—they are significantly water soluble and release corrosive solutions.

There have been various developments of Sorel cements. For example, one product consists of Sorel cement with up to 10 percent of a water-soluble ammonium salt such as ammonium chloride and sometimes also similar quantities of an aminoplast. These additives are included to give the Sorel cement better resistance against magnesium sulfate present in the inflow of water or brine to be sealed and also better setting priorities. Another Sorel cement product consists of a stoichiometric mixture of magnesium and calcium oxides, carbonates and sulfates, which is hydrated in chloride-containing waters. This particular cement mix is described as reacting by polymerization to form a magnesium hydroxysulfate/chloride polyhydrate of high compressive strength. A water resisting Sorel cement was obtained by including a suitable additive containing $H_3PO_3$ to the MgO—$MgCl_2$—$H_2O$-fly ash system. This allowed the formation of a stable phase $5Mg(OH)_2 \cdot MgCl_2 \cdot 8H_2O$, together with the insoluble phase $Mg_2P_2O_7$, in the hardened magnesium oxychloride matrix.

Magnesium oxysulfate cements can be produced by adding magnesium chloride solutions to calcium sulfates or calcium phosphate-sulphate mixtures. The magnesium oxysulfate cements formed can be regarded as variants of Sorel cements. The phosphates, where present, improve the rheological properties of the cement pastes and their water resistance. Alternatively, magnesium oxide can be treated with sulfuric acid to form magnesium oxysulfate cements. The following phases have been identified in the latter instance depending upon the temperature and pressure conditions.

$$3Mg(OH)_2 \cdot MgSO_4 \cdot 8H_2O$$

$$5Mg(OH)_2 \cdot MgSO_4 \cdot 3H_2O$$

$$Mg(OH)_2 \cdot MgSO_4 \cdot 5H_2O$$

$$Mg(OH)_2 \cdot 2MgSO_4 \cdot 3H_2O$$

$$2Mg(OH)_2 \cdot 3MgSO_4 \cdot 5H_2O$$

$$MgSO_4 \cdot H_2OSO_4 \cdot 3H_2O$$

$$3Mg(OH)_2 \cdot MgSO_4 \cdot 4H_2O$$

In an embodiment, the CPCC comprises a Sorel cement. The Sorel cement may comprise a metal oxide, alternatively an alkaline earth metal oxide, alternatively magnesium oxide. In an embodiment, the Sorel cement comprises MgO. MgO may be prepared by calcination of $Mg(OH)_2$ as depicted in Reaction 1:

(Reaction 1)

The calcination of $Mg(OH)_2$ results in what is commonly referred to as "burned" MgO. Three basic grades of burned MgO are typically produced with the differences between each grade related to the degree of reactivity remaining after being exposed to a range of high temperatures. The original magnesium hydroxide particle is usually a large and loosely bonded particle. Exposure to thermal degradation by calcination causes the $Mg(OH)_2$ to alter its structure so that the surface pores are slowly filled in while the particle edges become more rounded. This results in MgO with varying degrees of crystallinity and consequently varying degrees of reactivity. When the MgO is produced by calcining to temperatures ranging between 1500° C. to 2000° C., the MgO is referred to as "dead-burned" since the majority of the reactivity has been eliminated. Dead-burned MgO has the highest degree of crystallinity of the three grades of burned MgO. An example of a dead-burned MgO includes without limitation THERMATEK™ HT additive, which is commercially available from Halliburton Energy Services, Inc. A second type of MgO produced by calcining at temperatures ranging from 1000° C. to 1500° C. is termed "hard-burned" and displays an intermediate crystallinity and reactivity when compared to the other two grades of burned MgO. An example of a hard-burned MgO includes without limitation THERMATEK™ LT additive, which is commercially available from Halliburton Energy Services, Inc. The third grade of MgO is produced by calcining at temperatures ranging from 700° C. to 1000° C. and is termed "light-burned" or "caustic" magnesia. Light-burned MgO is characterized by a high surface area, a low crystallinity and a high degree of reactivity when compared to the other grades of burned MgO.

In an embodiment, the MgO for use in the Sorel cement comprises 100% dead-burned MgO (e.g., THERMATEK™ HT additive), 100% hard-burned MgO (e.g., THERMATEK™ LT additive), 100% light-burned MgO, or a combinations thereof. In other embodiments, the MgO for use in the Sorel cement comprises combinations of hard-burned MgO, light-burned MgO and/or dead-burned MgO. One of ordinary skill in the art with the aid of this disclosure may select the ratio of hard-burned MgO, light-burned MgO, and/or dead-burned MgO to achieve one or more user desired properties. For example, the MgO may comprise a combination of 90% to 80% dead-burned and 10% to 20% light-burned, alternatively the MgO may comprise a combination of 90 to 80% hard-burned and 10 to 20% light-burned.

In an embodiment, the Sorel cement comprises a soluble salt. The soluble salt may include a chloride salt, a phosphate salt, or combinations thereof.

In an embodiment, the Sorel cement comprises a phosphate salt such as for example potassium dihydrogen phosphate, sodium dihydrogen phosphate, ammonium dihydrogen phosphate, or combinations thereof. In such embodiments, the ratio of MgO:phosphate salt may be from about 1:4 alternatively from about 1:3, alternatively from about 1:2, alternatively from about 1:1.

In an embodiment, the Sorel cement comprises a chloride salt. In such an embodiment, the Sorel cement may comprise an alkaline earth metal chloride, for example a magnesium chloride ($MgCl_2$) such as magnesium chloride hexahydrate, $MgCl_2.6H_2O$. $MgCl_2.6H_2O$ is well known and available from a wide variety of sources. A $MgCl_2.6H_2O$ suitable for use in this disclosure includes without limitation C-TEK magnesium chloride salt, which is $MgCl_2.6H_2O$ commercially available from Halliburton Energy Services, Inc. In an embodiment, the soluble salt may be incorporated into the Sorel cement as the solid material (e.g., C-TEK). Alternatively, the soluble salt may be dissolved in an aqueous solution to form a salt solution at least a portion of which may be used to prepare the Sorel cement. The concentration of the salt solution may be selected by one of ordinary skill in the art with the aid of this disclosure to meet the needs of the process. For example, the C-TEK may be dissolved in the aqueous solution to its saturation point. In an embodiment, the soluble salt may be dissolved in an aqueous solution and may have a concentration of from about 10 wt. % to about 70 wt. % by total weight of the aqueous solution, alternatively from about 20 wt. % to about 70 wt. % alternatively from about 40 wt. % to about 67 wt. %.

In an embodiment, the Sorel cement is formed through contacting MgO with $MgCl_2.6H_2O$ in the presence of other components to be described in more detail later herein. In such an embodiment, the Sorel cement may comprise metal oxide (e.g., MgO) and soluble salt (e.g., $MgCl_2.6H_2O$) present in a ratio of from about 2:1 to about 1:1 MgO: $MgCl_2.6H_2O$, alternatively from about 1.5:1 to about 1:1 MgO:$MgCl_2.6H_2O$, and, alternatively about 1:1 MgO: $MgCl_2.6H_2O$. Examples of Sorel cements comprising MgO and $MgCl_2.6H_2O$ (e.g., C-TEK) include without limitation THERMATEK™ fluid invasion control treatment, which is commercially available from Halliburton Energy Services Inc.

In an embodiment, the CPCC comprises an LR. The LR may comprise a retarder dissolved in an aqueous solution. Retarders, also referred to as inhibitors, may be used to adjust the time required for setting of the slurry. Retarders suitable for use in this disclosure include without limitation polyphosphate salts such as sodium hexametaphosphate (technical grade granular), potassium magnesium phosphate hexahydrate, potassium magnesium hexametaphosphate, or combinations thereof. Other examples of set retarders suitable for use in this disclosure include boric acid and salts of boric acid such as sodium borate. An example of a retarder suitable for use in this disclosure includes without limitation R-TEK retarder, which is sodium hexametaphosphate commercially available from Deepearth Solutions.

In an embodiment, the LR comprises an aqueous solution of sodium hexametaphosphate. In an embodiment, the LR is prepared by dissolving the retarder (e.g., sodium hexametaphosphate) in an aqueous solution to produce a final concentration of equal to or less than about 25 wt. %, alternatively 24, 23, 22, 21, 20, 19, 18, 17, 16, 15, 14, 13, 12, 11, 10, 9, 8, 7, 6, 5, 4, 3, 2, 1 wt. %. In an embodiment, the LR may be present in the CPCC such that the amount of retarder in the composition is from about 0.05 wt. % to about 15 wt. % by weight of the MgO, alternatively from about 0.1 wt. % to about 12 wt. %, alternatively from about 0.2 wt. % to about 10 wt. %.

The CPCC may include a sufficient amount of water to form a pumpable slurry. The water may be fresh water or salt water, e.g., an unsaturated aqueous salt solution or a saturated aqueous salt solution such as brine or seawater. The water may be present in the amount from about 10 wt. % to about 200 wt. % by weight of cement (bwoc) wherein the cement comprises both the MgO and the soluble salt, alternatively from about 50 wt. % to about 200 wt. %, alternatively from about 50 wt. % to about 180 wt. %, alternatively from about 20 wt. % to about 60 wt. %, alternatively from about 30 wt. % to about 70 wt. % by weight of MgO.

In some embodiments, additives may be included in the CPCC for improving or changing the properties thereof. Examples of such additives include but are not limited to accelerants, fluid loss agents, weighting materials, dispersants, vitrified shale, formation conditioning agents, viscosifiers, waterproofing agents, or combinations thereof. Other mechanical property modifying additives, for example, carbon fibers, glass fibers, metal fibers, minerals fibers, and the like can be added to further modify the mechanical properties. These additives may be included singularly or in combination. Methods for introducing these additives and their effective amounts are known to one of ordinary skill in the art with the aid of this disclosure.

In an embodiment, a CPCC of the type disclosed herein may comprise MgO in an amount of from about 30 wt. % to about 70 wt. % by total weight of the CPCC, wherein the MgO may comprise dead-burned MgO and hard-burned MgO wherein the ratio of dead-burned MgO:hard-burned MgO is from about 05:95 to about 50:50, $MgCl_2$ which may be present in an amount of from about 25 wt. % to about 70 wt. % by weight of MgO; liquid retarder which may be present in an amount of from about 0.01 wt. % to about 15 wt. % by weight of MgO, and aqueous fluid (i.e., water) which may be present in an amount of from about 50 wt. % to about 200 wt. % by weight of MgO.

Figure 1:
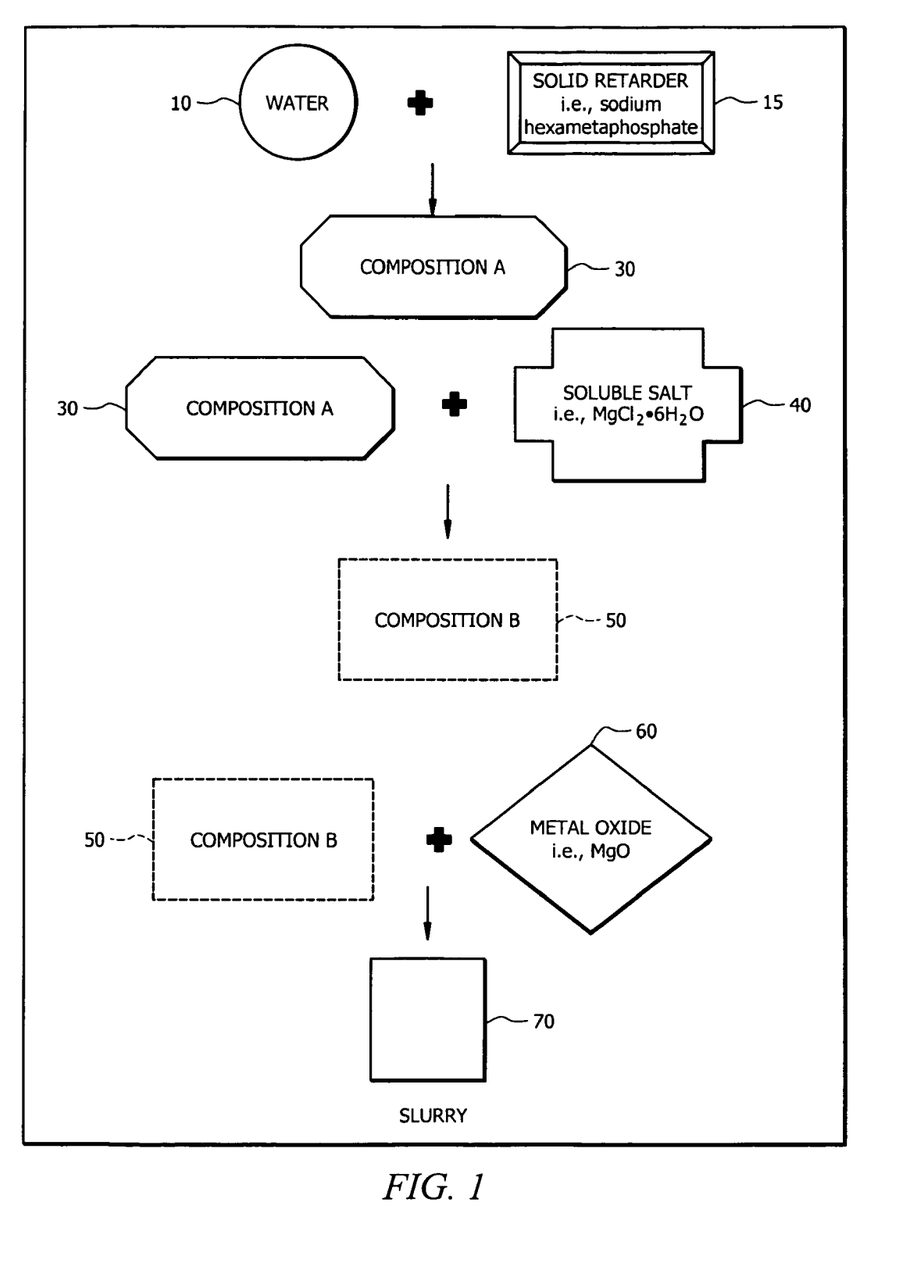
FIG. 1 is a schematic of a conventional contacting sequence for the preparation of a Sorel cement composition.

Referring to FIG. 1, a cement composition comprising a Sorel cement, a solid retarder, and water may be prepared by contacting the components in the conventional contacting sequence wherein: (a) water 10 is first contacted with a solid retarder 15 such as sodium hexametaphosphate (e.g., R-TEK) to form a first composition, Composition A 30; (b) Composition A 30 is then contacted with a soluble salt 40 such as $MgCl_2.6H_2O$ (e.g., C-TEK) to form a second mixture, Composition B 50; and (c) Composition B 50 is then contacted with a metal oxide 60 such as MgO (e.g., T-TEK) to form a slurry 70. The soluble salt may be either a dry salt or a predissolved salt solution. Hereinafter, the disclosure will refer to the use of a concentrated solution of the soluble salt. The conventional contacting sequence employed ensures the effectiveness of the retarder (e.g., sodium hexametaphosphate) in controlling the thickening and setting time of the slurry. Alteration of the conventional contacting sequence may result in a cementitious slurry having a thickening time comparable to that of a slurry lacking a retarder. The thickening time refers to the time required for the slurry to achieve 70 Bearden units of Consistency (Bc). In order words, alterations in the conventional contacting sequence may nullify the function of the retarder.

Figure 2:
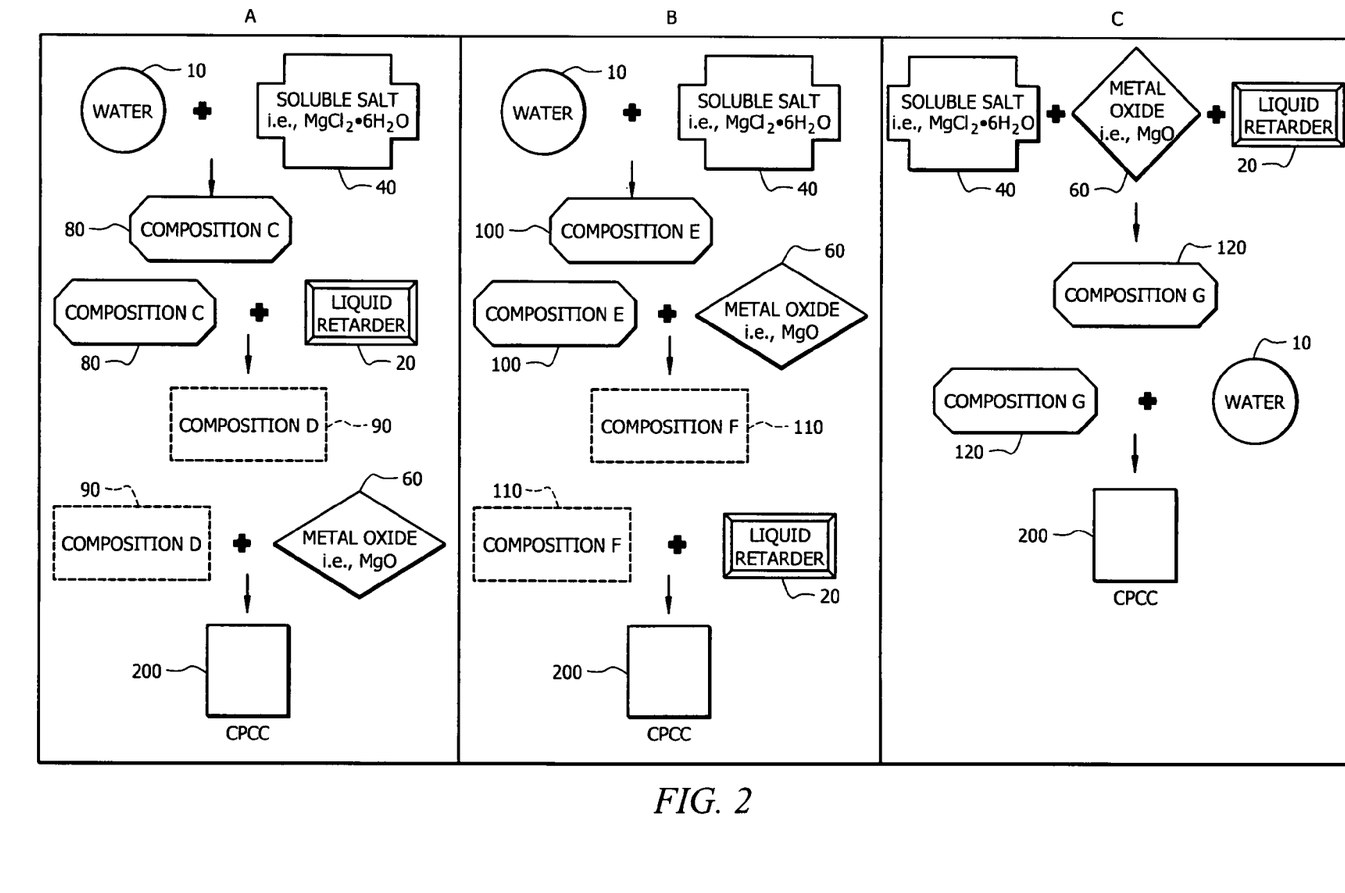
FIG. 2 depicts embodiments of contacting sequences for the preparation of a continuous process cement composition.

In an embodiment, a methodology for the preparation of cementitious slurry of the type described herein (i.e., a CPCC) comprising a Sorel cement and a liquid retarder having a concentration of less than about 25 w/v % comprises contacting the components of the CPCC in any order compatible with the needs of the process. Possible contacting sequences are schematized in FIG. 2. For example, referring to FIG. 2A, the CPCC may be prepared by contacting water 10 with a concentrated solution of the soluble salt 40 (e.g., $MgCl_2.6H_2O+H_2O$) to form a first composition, Composition C 80, followed by contacting Composition C 80 with the liquid retarder 20 (e.g., less than 25 w/v % solution of R-TEK) to form a second composition, Composition D 90, which may then be contacted with the metal oxide 60 (e.g., T-TEK) to form a CPCC 200. Alternatively, referring to FIG. 2B, the CPCC 200 may be prepared by contacting water 10 with a concentrated solution of the soluble salt 40 (e.g., $C-TEK+H_2O$) to form a first composition, Composition E 100, followed by contacting Composition E 100 with the metal oxide 60 (e.g., T-TEK) to form a second composition, Composition F 110, which may subsequently be contacted with the liquid retarder 20 (e.g., less than 25 w/v % solution of R-TEK) to form a CPCC 200. Alternatively, the CPCC 200 may be prepared by precontacting the concentrated solution of a soluble salt 40 (e.g., $C-TEK+H_2O$), the liquid retarder 20 (e.g., less than 25 w/v % solution of R-TEK), and the metal oxide 60 (e.g., T-TEK) to form a premixture, Composition G 120; and subsequently contacting Composition G 120 with water 10 to form a CPCC 200. In an embodiment, the CPCC may be prepared by contacting the liquid retarder 20 with the remaining components in any order compatible with the needs of the process resulting in a cementitious composition having the properties to be described later herein.

Figure 3:
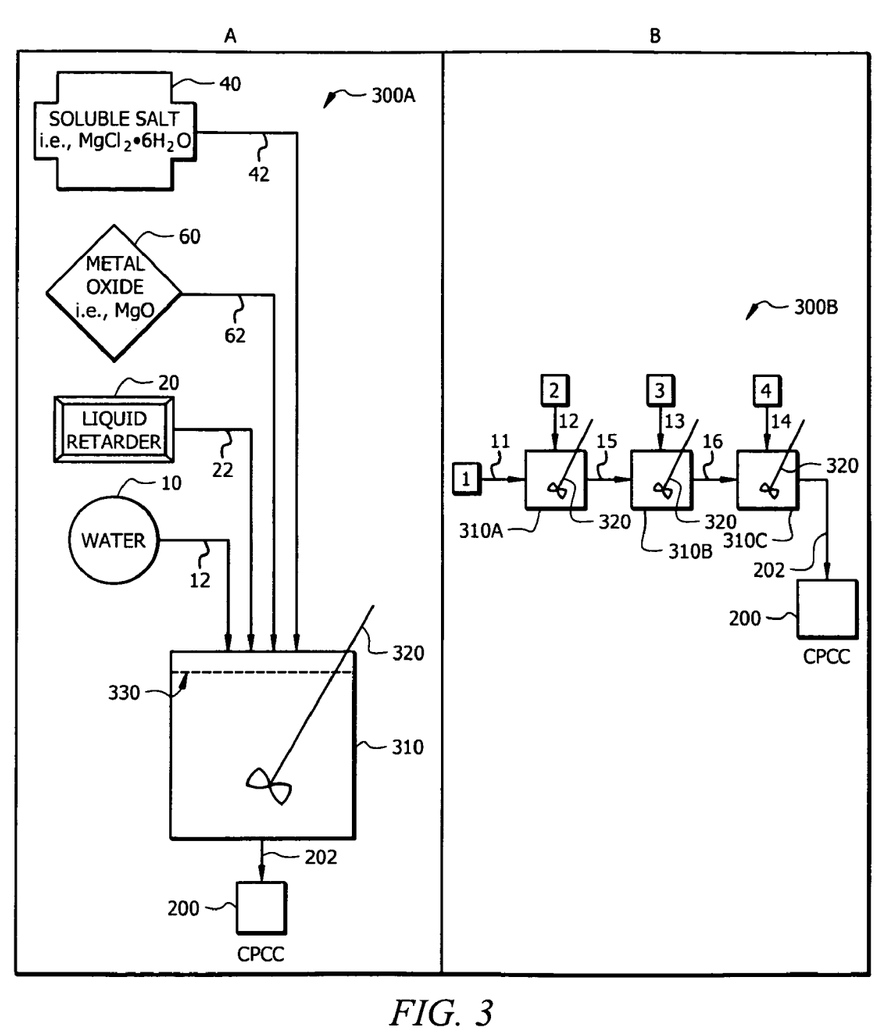
FIG. 3 depicts embodiments of a continuous process for preparing a cement composition.

The components of the CPCC may be contacted using any mixing device compatible with the composition, for example a batch mixer, or a recirculating cement mixer (RCM) having continuous feedlines for high volume cement production. In an embodiment, the CPCC may be prepared by a continuous process. FIG. 3A is a schematic of a system 300A wherein the CPCC 200 is prepared by a continuous process. Referring to FIG. 3A, the system 300A comprises four feeds: the soluble salt 40 which may be solid or predissolved in an aqueous solution to form a concentrated salt solution, the metal oxide 60, the liquid retarder 20, and water 10, all of which are in fluid communication with a container 310, which is in fluid communication with the resultant CPCC 200.

The four feeds may be introduced to the container 310: the concentrated solution of soluble salt 40 via flowline 42, the metal oxide 60 via flowline 62, the liquid retarder 20 via flowline 22, and water 10 via flowline 12. The four feeds may be continuously introduced into the container 310 to form the CPCC 200 at such a rate that amounts of the mixture's components are maintained in the ranges disclosed herein. The system 300A may further comprise devices for agitating the mixture's components in the container 310 such as for example an agitator 320. Additional devices or components (e.g., pumps) may regulate the components supply rates in such a way that a given level of filling 330 of the container 310 is constantly maintained and at least a portion of the resultant CPCC 200 may be continuously removed via flowline 202. The system 300A may comprise additional devices such as heaters/coolers, pumps, centrifuge units, drying units, process controllers, and the like as desired to meet the needs of the process. As such, the process conditions of the system 300A (e.g., time period, agitation methods, etc) may be selected by one of ordinary skill in the art with the aid of this disclosure to meet the needs of the process.

In another embodiment, the components used to prepare the CPCC may be stored in separate storage units and some of the components may be precontacted prior to being fed to the container 310. An example of such an embodiment is illustrated in FIG. 3B. FIG. 3B is a schematic of a system 300B wherein the CPCC 200 is prepared by a continuous process and wherein the components used to prepare the CPCC 200 are precontacted. In embodiments, the system 300B is used to implement the combinations shown in FIG. 2A, 2B, or 2C.

Referring to FIG. 3B, the system 300B comprises four feeds 1, 2, 3, and 4. Feeds 1 and 2 are in fluid communication with container 310A via flowlines 11 and 12 respectively. The container 310A and feed 3 are in fluid communication with a container 310B, which is disposed downstream of Container 310A, via flowlines 15 and 13 respectively. Container 310B and feed 4 are in fluid communication with a container 310C, which is disposed downstream of container 310B, via flowlines 16 and 14 respectively, which in turn is in fluid communication with the resultant CCPC 200. The feeds 1, 2, 3, and 4 may interchangeably be a concentrated solution of a soluble salt 40, the metal oxide 60, the liquid retarder 20, and water 10. In alternatively embodiments, feeds 1, 2, 3, and 4 may be split and fed to more than one container, and more than two feeds may be fed to any given container. Likewise, less than or greater than three containers may be used, and again the feeds 1, 2, 3, and 4 may be split and fed to any number and/or combination of containers consistent with the disclosure herein.

Feeds 1 and 2 may be introduced to a container 310A and form a composition 15. Composition 15 and feed 3 may be introduced to a container 310B via flowlines 15 and 13 respectively to form a composition 16. Composition 16 and feed 4 may be introduced to a container 310C via flowlines 16 and 14 and may form the resultant CCPC 200. The resultant CCPC 200 may be continuously removed via flowline 202. Similar to system 300A, agitators 320 may be employed in containers 310A, 310B, and 310C. The feeds 1, 2, 3, and 4, may be continuously introduced to the respective containers at such a rate that the amount of each component is maintained at the ranges disclosed herein. Further, the rate of flow of a mixture from one container to another with which it is fluid communication may be continuous. Additional devices or components may be included as described previously.

In an embodiment, a CPCC of the type disclosed herein may be prepared via a continuous process with an output rate of from about 0.5 barrels per minute (BPM) to about 20 BPM, alternatively from about 1 BPM to about 9 BPM, alternatively from about 3 BPM to about 6 BPM.

In an embodiment, the CPCC comprises a liquid retarder, a concentrated soluble salt, and a magnesium oxide, all of the type and in the amounts described herein. In an embodiment, the CPCCs disclosed herein are produced in larger volumes than cement compositions prepared using a conventional contacting sequence and a solid retarder. When batch mixing, the amount of slurry needed, also termed the treatment volume, is limited to the volume of the batch mixing equipment. Further, the conventional contacting sequence involves process delays as there are production lags corresponding to the time required for contacting and dissolution of the solid components in aqueous fluids.

In an embodiment, a large treatment volume may be desired in order to carry out a process with a single treatment as opposed to employing multiple smaller treatments in order to carry out the same process. Thus, a single treatment volume may be a sufficient volume to complete the wellbore service as a continuous service, for example continuously preparing and pumping a stream of service fluid into the wellbore. CPCCs prepared as described herein may allow for the on-site production of large treatment volumes which may allow for a wellbore servicing process to be carried out using a single treatment thus improving the overall process efficiency and economics by for example, by decreasing the on-site preparation time and labor. CPCCs may be prepared in treatment volumes of greater than about 25 barrel (bbl), alternatively greater than about 50 bbl, alternatively greater than about 100 bbl. For example, using a CPCC of the type described herein, the liquid retarder and concentrated salt solution may be prepared and transported to the well site. At the well site, the use of a liquid retarder and a concentrated salt solution reduces the overall process time by obviating the time required for dissolution of a solid retarder and/or a solid soluble salt. This may decrease the rig time necessary for the operator to carry out the treatment resulting in an improved overall process economics.

Furthermore, CPCCs when produced as described herein may display an increased utility in wellbore servicing operations due to their ability to be produced via a continuous process. For example, a wellbore servicing operation seeking to utilize a large treatment volume may require the use of equipment and supplies that require a significant amount of space. Many wellbore servicing operations occur at sites (e.g., an offshore platform, hillsides) that impose physical limitations on the type and number of equipment/devices utilized in the operation. CPCCs prepared as described herein may be produced using equipment that has a smaller footprint when compared to an otherwise similar composition prepared via a batch process.

The CPCCs of this disclosure may display expanded and improved utility as wellbore servicing fluids when compared to a Sorel cement and solid retarder prepared by a conventional contacting sequence.

The CPCCs of this disclosure also exhibit a relatively constant viscosity for a period of time after they are initially prepared and while they are being placed in their intended locations in the wellbore, i.e., during the period when the slurry is in motion. Eventually, the CPCCs quickly set such that the viscosity of the placed slurry increases from about 35 Bc to equal to or higher than 70 Bc in equal to or less than about 60 minutes, alternatively equal to or less than about 50 minutes, alternatively equal to or less than about 40 minutes, alternatively equal to or less than about 30 minutes, alternatively equal to or less than about 20 minutes, alternatively equal to or less than about 10 minutes, alternatively equal to or less than about 1 minute. In an embodiment, the set time corresponds to the exothermic hydration of the CPCC after which the strength development is faster than when the composition sets or becomes unpumpable due to gelation. This sudden jump in viscosity (i.e., from 35 Bc to 70 Bc after placement of the slurry) may be very desirable in preventing unwanted events such as gas or water migration into the slurry because it indicates the quick formation of an impermeable mass from a gelled state after placement. This behavior is often referred to as "Right Angle Set" and such cement compositions are termed "Right Angle Set Cement Compositions" in reference to the near right angle increase shown in a plot of viscosity over time.

The CPCCs of this disclosure may display a desirable thickening time that allows the composition to remain pumpable without gelling during downhole placement before setting. The thickening time refers to the time required after contacting of the slurry components for the composition to achieve 70 Bearden units of Consistency (Bc). At about 70 Bc, the slurry undergoes a conversion from a pumpable fluid state to a non-pumpable paste. In an embodiment, the CPCCs of this disclosure may have a thickening time of greater than about 40 min, alternatively greater than about 1 hour, alternatively greater than about 5 hours, alternatively greater than about 10 hours, alternatively greater than about 15 hours, alternatively greater than about 20 hours at temperatures of from about 50° F. to about 400° F., alternatively from about 120° F. to about 300° F., alternatively greater than about 200° F.

The CPCCs of this disclosure may develop an appreciable compressive strength when placed downhole. Herein the compressive strength is defined as the capacity of a material to withstand axially directed pushing forces. The maximum resistance of a material to an axial force is determined in accordance with API Recommended Practices 10B, Twenty-Second Edition, December 1997. Beyond the limit of the compressive strength, the material becomes irreversibly deformed and no longer provides structural support and/or zonal isolation. The compressive strength a set cement attains is a function of both the cement maturity (or cure time) and the temperature at which setting occurs. Herein the cement maturity or cure time is the time for required for hydration of the cementitious material. The cement maturity specifically refers to the time the cement formulation is allowed to set. In an embodiment, the CPCC may develop a compressive strength of from about 50 psi to about 20,000 psi, alternatively from about 100 psi to about 10,000 psi, alternatively from about 1000 psi to about 10,000 psi. The compressive strength of the CPCC may develop in from about 15 minutes to equal to or greater than about 24 hours, alternatively from about 20 minutes to about 10 hours, alternatively from about 30 minutes to about 8 hours.

The CPCC may be placed into a wellbore as a single stream and activated by downhole conditions to form a set rigid mass. In such an embodiment, the CPCC may be placed downhole through the drill bit forming a composition that substantially eliminates lost circulation. In yet another embodiment, the CPCC is formed downhole by the mixing of a first stream comprising one or more CPCC components such as for example MgO and chloride or phosphate salt and a second stream comprising additional CPCC components such as for example an LR. Alternatively, the CPCC may be formed downhole by the mixing of a first stream comprising MgO and a second stream comprising the chloride or phosphate salt, the LR, and optional additives. Methods for introducing compositions into a wellbore to seal subterranean zones are described in U.S. Pat. Nos. 5,913,364; 6,167,967; and 6,258,757, each of which is incorporated by reference herein in its entirety.

The CPCC disclosed herein may be used as a wellbore servicing fluid. As used herein, a "servicing fluid" refers to a fluid used to drill, complete, work over, fracture, repair, or in any way prepare a wellbore for the recovery of materials residing in a subterranean formation penetrated by the wellbore. It is to be understood that "subterranean formation" encompasses both areas below exposed earth and areas below earth covered by water such as ocean or fresh water. Examples of servicing fluids include, but are not limited to cement slurries, drilling fluids or muds, spacer fluids, fracturing fluids or completion fluids, and the like. Without limitation, servicing the wellbore includes positioning the CPCC in the wellbore to isolate the subterranean formation from a portion of the wellbore; to support a conduit in the wellbore; to plug a void or crack in the conduit; to plug a void or crack in a cement sheath disposed in an annulus of the wellbore; to plug an opening between the cement sheath and the conduit; to prevent the loss of aqueous or non-aqueous drilling fluids into loss circulation zones such as a void, vugular zone, or fracture; to be used as a fluid in front of cement slurry in cementing operations; to seal an annulus between the wellbore and an expandable pipe or pipe string; or combinations thereof.

In an embodiment, the CPCC may be introduced to the wellbore to prevent the loss of aqueous or non-aqueous drilling fluids into loss-circulation zones such as voids, vugular zones, and natural or induced fractures while drilling. The CPCC may form a non-flowing, intact mass inside the loss-circulation zone which plugs the zone and inhibits loss of subsequently pumped drilling fluid, which allows for further drilling. For example, the CPCC may function as a plug that is placed into an annulus of the wellbore and prepares the formation for placement of a second (e.g. cementitious) composition.

Alternatively, the CPCC when placed in a wellbore may be allowed to set such that it isolates the subterranean formation from a different portion of the wellbore. The CPCC thus forms a barrier that prevents fluids in that subterranean formation from migrating into other subterranean formations. In an embodiment, the wellbore in which the composition is positioned belongs to a multilateral wellbore configuration. It is to be understood that a multilateral wellbore configuration includes at least two principal wellbores connected by one or more ancillary wellbores.

In an embodiment, the CPCC may be used for plug and abandonment of a well, i.e., to prepare a well to be shut in and permanently isolated. A series of plugs comprising the CPCC may be set in the wellbore and tested at each stage for hydraulic isolation.

In an embodiment, the CPCC may serve as a spot fluid. A spot fluid herein refers to a small volume or pill of fluid placed in a wellbore annulus that may displace another wellbore servicing fluid such as for example a mud. The spot fluid may act as a settable fluid that when used will displace another wellbore servicing fluid from a crack or crevice in the wellbore and solidify to prevent flow of other wellbore servicing fluids into said cracks or crevices.

In an embodiment, the CPCC may display an increased resistance to carbon dioxide ($CO_2$). Without wishing to be limited by theory, contacting of $CO_2$ present in the wellbore with the CPCC may result in the formation of insoluble carbonate species that provide a barrier to $CO_2$ attack. $CO_2$ may be used in wellbore servicing operations to enhance oil recovery by injecting $CO_2$ (usually in supercritical or liquefied condition) into an adjacent to the wellbore. $CO_2$ reduces oil viscosity resulting in the miscible or partially miscible displacement of the oil.

In an embodiment, a method of servicing a wellbore comprises providing a liquid retarder (e.g., a less than about 25 wt. % aqueous solution of sodium hexametaphosphate), a soluble chloride salt (e.g., a saturated solution of $MgCl_2.6H_2O$), and solid MgO (e.g., THERMATEK LT additive or THERMATEK HT additive) at the site of the wellbore. The components of the slurry may be introduced to a recirculating mixer in order to generate via a continuous process a CPCC which is placed downhole in order to provide one or more user-desired services.

EXAMPLES

The disclosure having been generally described, the following examples are given as particular embodiments of the disclosure and to demonstrate the practice and advantages thereof. It is understood that the examples are given by way of illustration and are not intended to limit the specification or the claims in any manner.

Example 1

The effect of the contacting sequence on the thickening time of three CPCC samples (Samples 4-6), were compared to a Sorel cement lacking a retarder (Sample 1) and two Sorel cements mixed with a solid retarder (Samples 2 and 3). The Sorel cement used was THERMATEK™ fluid invasion control treatment which is a mixture of MgO (i.e., T-TEK) and $MgCl_2.6H_2O$ (i.e., C-TEK) commercially available from Halliburton Energy Services, Inc. The retarder used was sodium hexametaphosphate (i.e., R-TEK) commercially available from Deepearth Solutions. For samples 4 to 6, R-TEK was added as a 15-50 wt. % aqueous solution (i.e., liquid retarder).

Samples 1 and 2 were prepared using a conventional contacting sequence wherein water was first contacted with solid R-TEK, followed by C-TEK, and T-TEK, which is schematically shown in FIG. 1. Samples 4-6 were prepared by contacting water with C-TEK first, followed by R-TEK which was introduced as the liquid retarder, and then T-TEK, which is schematically shown in FIG. 2A. Herein, the sequence of FIG. 2A is referred to as a reverse contacting sequence. Sample 3 was prepared using a modified reverse contacting sequence wherein water was contacted with C-TEK first, followed by solid R-TEK, and then T-TEK. The amounts of each component for each sample are presented in Table 1.

The thickening time for each sample was determined while continuously shearing at a shear rate of 150 RPM. The thickening time was measured according to the API procedure using a ramp time of 35 minutes at 80° F. and 8000 psi. The results of these thickening time measurements are shown in Table 1.

TABLE 1

| Sample | Slurry Composition | | | | Contacting order | | Thickening Time hrs:min |
|---|---|---|---|---|---|---|---|
| | Water (g) | R-TEK (g) | C-TEK (g) | T-TEK-LT (g) | | | |
| 1 | 200 | — | 300 | 300 | Conventional | No retarder was used | 1:48 |
| 2 | 200 | 3 | 300 | 300 | Conventional | solid R-TEK was added before C-TEK | 5:43 |
| 3 | 200 | 3 | 300 | 300 | Reverse | C-TEK was added before solid R-TEK | 1:51 |
| 4 | 197 | 6 (50% liquid) | 300 | 300 | Reverse | C-TEK was added before liquid R-TEK | 1:44 |
| 5 | 191 | 12 (25% liquid) | 300 | 300 | Reverse | C-TEK was added before liquid R-TEK | 2:04 |
| 6 | 183 | 20 (15% liquid) | 300 | 300 | Reverse | C-TEK was added before liquid R-TEK | 5:52 |

The results demonstrate that when a modified reverse contacting sequence was used in Sample 3 which was prepared using a solid retarder, the effect of R-TEK as a retarder was nullified. However, by using a liquid retarder, which was a solution comprising less than about 25 w/v % R-TEK (Samples 5 and 6), the effectiveness of the retarder is maintained when using a reverse contacting sequence.

Figure 4:
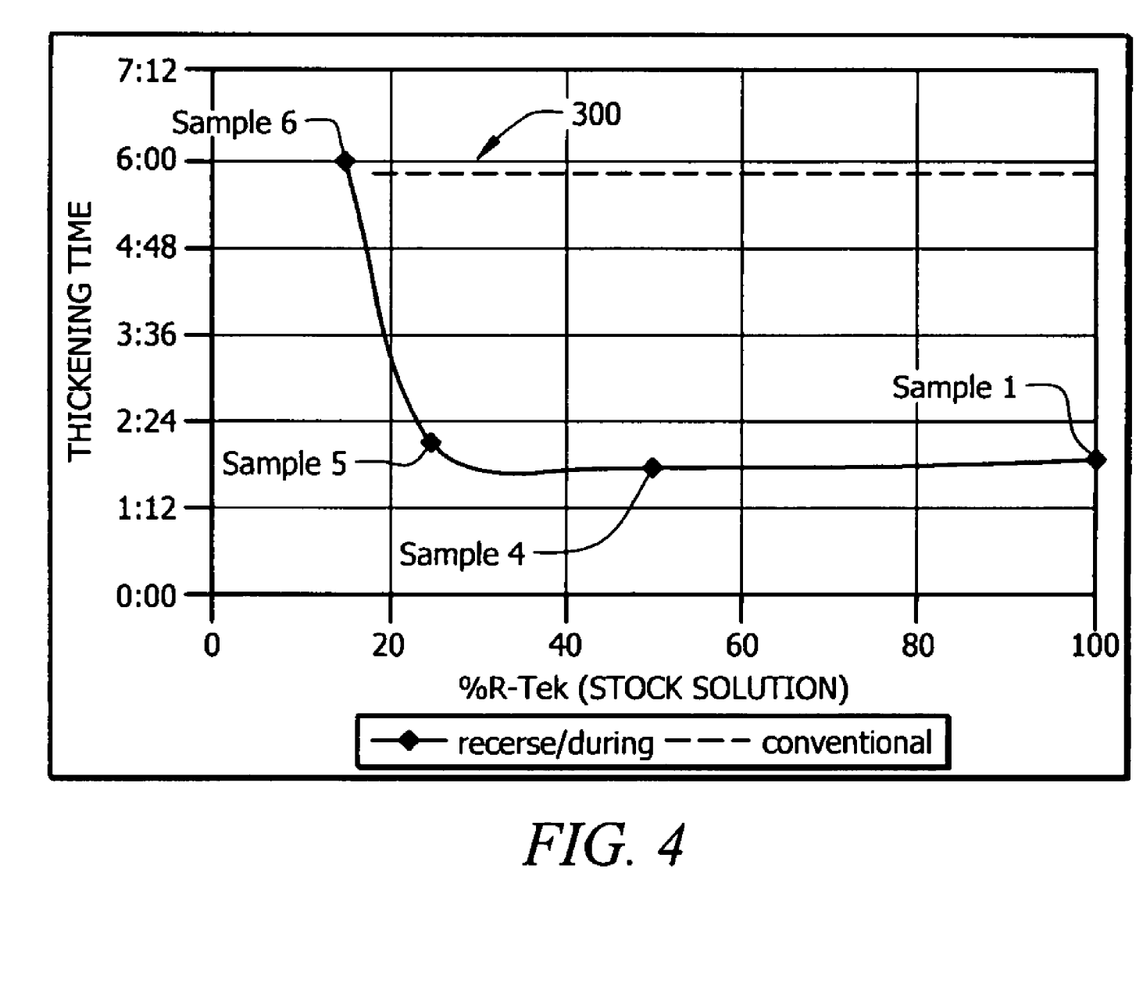
FIG. 4 is a plot of percentage R-TEK solution as a function of thickening time for the samples from Example 1.

FIG. 4 is a plot of % R-TEK solution as a function of thickening time for samples prepared using a liquid retarder and either the conventional (i.e., liquid R-TEK/C-TEK/T-TEK) or reverse contacting sequence (i.e., C-TEK/liquid R-TEK/T-TEK). Three additional samples were prepared as described previously with the exception that the liquid retarder was either a 15 wt. %, 25 wt. %, or 50 wt. % R-TEK solution. Samples prepared by contacting the components in the conventional contacting sequence displayed a similar thickening time of about 5 hours and 50 minutes as shown in FIG. 4, by the dotted line 300. However, the thickening times of cement slurries prepared using a reverse contacting sequence and various R-TEK stock solution concentrations was less than abut 2.5 hours. However, when less than a 25 wt. % R-TEK solution was used to prepare the cement slurries, the thickening time of the cement slurries increased and approached the thickening time of the cement slurries prepared using a conventional contacting sequence.

Collectively the results demonstrate the ability to vary the mixing order for the preparation of a Sorel cement composition when using a liquid retarder comprising less than about 25 w/v % sodium hexametaphosphate.

Figure 5:
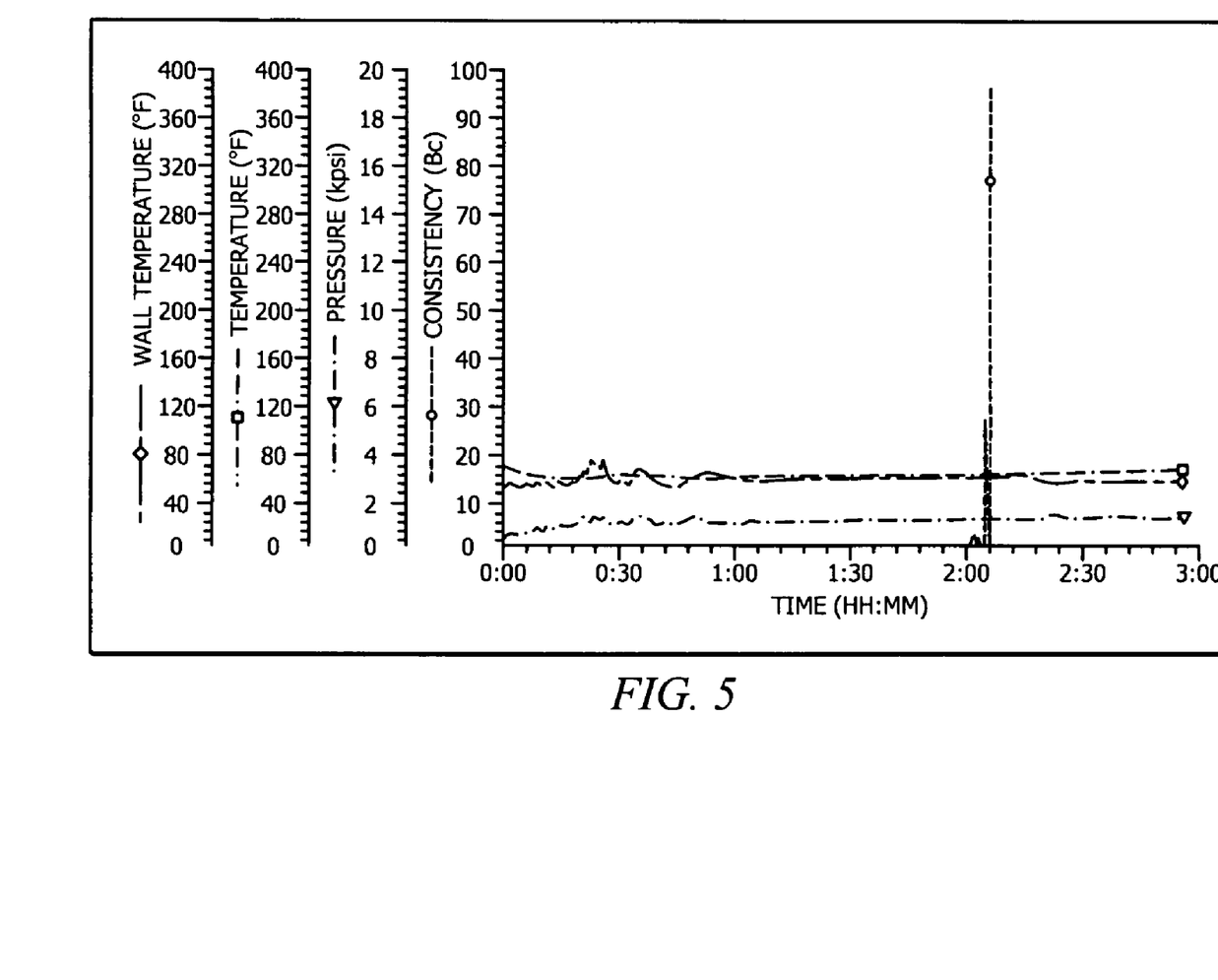
FIG. 5 is a graph of slurry viscosity as a function of temperature.

The thickening time and consistency of the slurry in Sample 6 were investigated and showed a "Right Angle Set" behavior. The "Right Angle Set" behavior from Sample 6 was similar to that observed for a composition comprising a Sorel cement and solid retarder prepared by a conventional contacting sequence. This right angle set behavior is illustrated in FIG. 5 which is a graph of slurry viscosity as a function of temperature for a composition comprising a Sorel cement and solid retarder prepared by a conventional contacting sequence.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of servicing a wellbore comprising:
   (a) contacting an aqueous solution with a soluble salt to form a salt solution;

(b) contacting an aqueous solution with a solid retarder to form a liquid retarder wherein the liquid retarder has concentration of less than about 25 w/v %;

(c) contacting water, the salt solution, and the liquid retarder to form a mixture;

(d) contacting the mixture with a metal oxide to form a cement slurry, wherein the cement slurry is produced with an output rate of from about 0.5 barrels per minute to about 20 barrels per minute;

(e) placing the cement slurry into the wellbore; and (f) allowing the cement slurry to set and form a set cement.

2. The method of claim 1 wherein the cement slurry is placed in the wellbore in a single treatment volume.

3. The method of claim 1 wherein the metal oxide, soluble chloride or phosphate salt, water, and liquid retarder are contacted simultaneously.

4. The method of claim 1 wherein the cement slurry is formed as a continuous process comprising the continuous addition of the metal oxide, soluble chloride or phosphate salt, water, and liquid retarder to a mixing device and the continuous removal of the cement slurry from the mixing device and placement thereof into the wellbore.

5. The method of claim 1 wherein the liquid retarder is selected from the group consisting of sodium hexametaphosphate, potassium magnesium phosphate hexahydrate, potassium magnesium hexametaphosphate, and combinations thereof.

6. The method of claim 1 wherein the liquid retarder comprises an aqueous solution of sodium hexametaphosphate.

7. The method of claim 1 wherein the metal oxide comprises an alkaline earth metal oxide.

8. The method of claim 7 wherein the alkaline earth metal oxide comprises magnesium oxide.

9. The method of claim 8 wherein the magnesium oxide is selected from the group consisting of dead-burned magnesium oxide, hard-burned magnesium oxide, light-burned magnesium oxide, and combinations thereof.

10. The method of claim 1 wherein the soluble salt is selected from the group consisting of an alkaline earth metal chloride, magnesium chloride, magnesium chloride hexahydrate, sodium phosphate, potassium phosphate, ammonium phosphate, and combinations thereof.

11. The method of claim 1 wherein the soluble salt is dissolved in an aqueous solution.

12. The method of claim 11, wherein the soluble salt has a concentration in the aqueous solution of from about 10 wt. % to about 70 wt. % by total weight of the aqueous solution.

13. The method of claim 1 wherein the liquid retarder is present in an amount of from about 0.05 wt. % to about 15 wt. % by weight of the magnesium oxide.

14. The method of claim 1 wherein the metal oxide and the soluble salt is present in the cement composition in a ratio of from about 2:1 to about 1:1.

15. The method of claim 1 wherein the water is present in an amount of from about 10 wt. % to about 200 wt. % by weight of the metal oxide and soluble salt.

16. The method of claim 1 wherein the slurry displays a right angle set.

17. The method of claim 1 wherein the set cement has a compressive strength of from about 50 psi to about 20,000 psi.

18. The method of claim 1 wherein the slurry has a thickening time of greater than about 40 minutes.

19. The method of claim 1 wherein steps (c) and (d) are carried out simultaneously in a recirculating mixer.

20. The method of claim 1 wherein the cement slurry is prepared in a treatment volume of greater than about 25 barrels.

* * * * *